United States Patent [19]

Matsuzaki

[11] Patent Number: 4,488,200

[45] Date of Patent: Dec. 11, 1984

[54] NO-BREAK POWER SUPPLY APPARATUS

[75] Inventor: Kaoru Matsuzaki, Tokyo, Japan

[73] Assignee: Tokyo Shibaura Denki Kabushiki Kaisha, Kawasaki, Japan

[21] Appl. No.: 422,198

[22] Filed: Sep. 23, 1982

[51] Int. Cl.³ .............................................. H02H 7/122
[52] U.S. Cl. ..................................... 361/104; 361/18; 363/58
[58] Field of Search .................... 361/18, 103, 104; 363/57, 58, 71, 136, 137

[56] References Cited

U.S. PATENT DOCUMENTS 4,063,302 12/1977 Donig et al. ............... 361/104 X
4,384,248 5/1983 Matsuda et al. ............ 363/58 X

FOREIGN PATENT DOCUMENTS 535656 11/1976 U.S.S.R. ............................ 363/58

Primary Examiner—Harry E. Moose, Jr.
Attorney, Agent, or Firm—Oblon, Fisher, Spivak, McClelland & Maier

[57] ABSTRACT

A no-break power supply apparatus includes a plurality of CVCFs, each CVCF having a bridge circuit having an arm including inverters, a parallel circuit having the GTO thyristor and a diode connected in reverse polarity in parallel with the GTO thyristor, a fuse connected in series with the parallel circuit, and a fuse melting detector connected across the fuse, and protecting circuits controlled for supplying a predetermined ON gate signal/OFF gate signal in accordance with the fuse melting detection signal detected when an accident occurs to the gate of each GTO thyristor.

4 Claims, 9 Drawing Figures

NO-BREAK POWER SUPPLY APPARATUS

BACKGROUND OF THE INVENTION

The present invention relates to a no-break power supply apparatus in which a plurality of constant-voltage constant-frequency power supplies having inverters constructed of gate turn off thyristors and gate control circuits therefor are operated in parallel.

In a constant-voltage constant-frequency power supply (hereinafter abbreviated as to "CVCF") in a conventional no-break power supply apparatus, it was indispensable to provide thyristor breakers at the output side, and when a D.C. shortcircuit occurred due to commutation failure in one of the inverters which were operated in parallel, the thyristor breaker was operated to disconnect the failed inverter from the power supply and a load, and a power was supplied only from the proper inverters to the load. However, the thyristor breakers were expensive, and since a plurality of inverters were operated in parallel, it had the drawback that the entire apparatus has become even more expensive because an inverter had to be provided for each power supply.

SUMMARY OF THE INVENTION

It is an object of the present invention to provide a no-break power supply apparatus which is capable of omitting thyristor breakers used heretofore and in which a plurality of CVCFs each having inverter constructed of gate turn off thyristers and a gate control circuit therefor can be operated in parallel.

In order to achieve the above and other objects, there is provided according to the present invention a no-break power supply apparatus which comprises a plurality of CVCFs, each CVCF having input breaker means connected to a D.C. power supply; output breaker means connected to a load; a D.C. filter means connected to said input breaker, an inverter means constructed of gate turn off thyristors connected to said D.C. filter means for converting the direct current from the D.C. power supply to an alternating current, the inverter means having a bridge circuit including arms, each arm having a parallel circuit of a GTO thyristor and a diode connected in opposite polarity in parallel to the GTO thyristor, a fuse connected directly to the parallel circuit and a fuse melting detector connected across the fuse; protecting circuit means connected to the inverter means for detecting the melting of the fuse corresponding to an accident by a corresponding fuse melting detector, blocking a gate signal supplied to the gates of all the GTO thyristors normally operated by the output of the detector, then supplying an OFF gate signal to the gate of the GTO thyristor, except the GTO thyristors connected to the arm of the fuse thus melted, and supplying a breakage command signal to said input breaker means and said output breaker means; inverter transformer means connected to said inverter means for converting the input voltage into a predetermined voltage; and A.C. filter means connected to said inverter transformer means for removing the high frequency component from the A.C. voltage and supplying the sinusoidal A.C. voltage to a load through the output breaker.

With the structure thus constructed of the no-break power supply apparatus of the present invention, it can eliminate the expensive thyristor breakers in the CVCF which were indispensable in the conventional apparatus, thereby reducing the size and cost thereof.

DETAILED DESCRIPTION OF THE PREFERRED EMBODIMENTS

For the purpose of aiding the understanding of the no-break power supply apparatus according to the present invention prior to the description of the embodiments of the present invention, a conventional no-break power supply apparatus in which two CVCFs are operated in parallel will be described with reference to FIG. 1.

Figure 1:
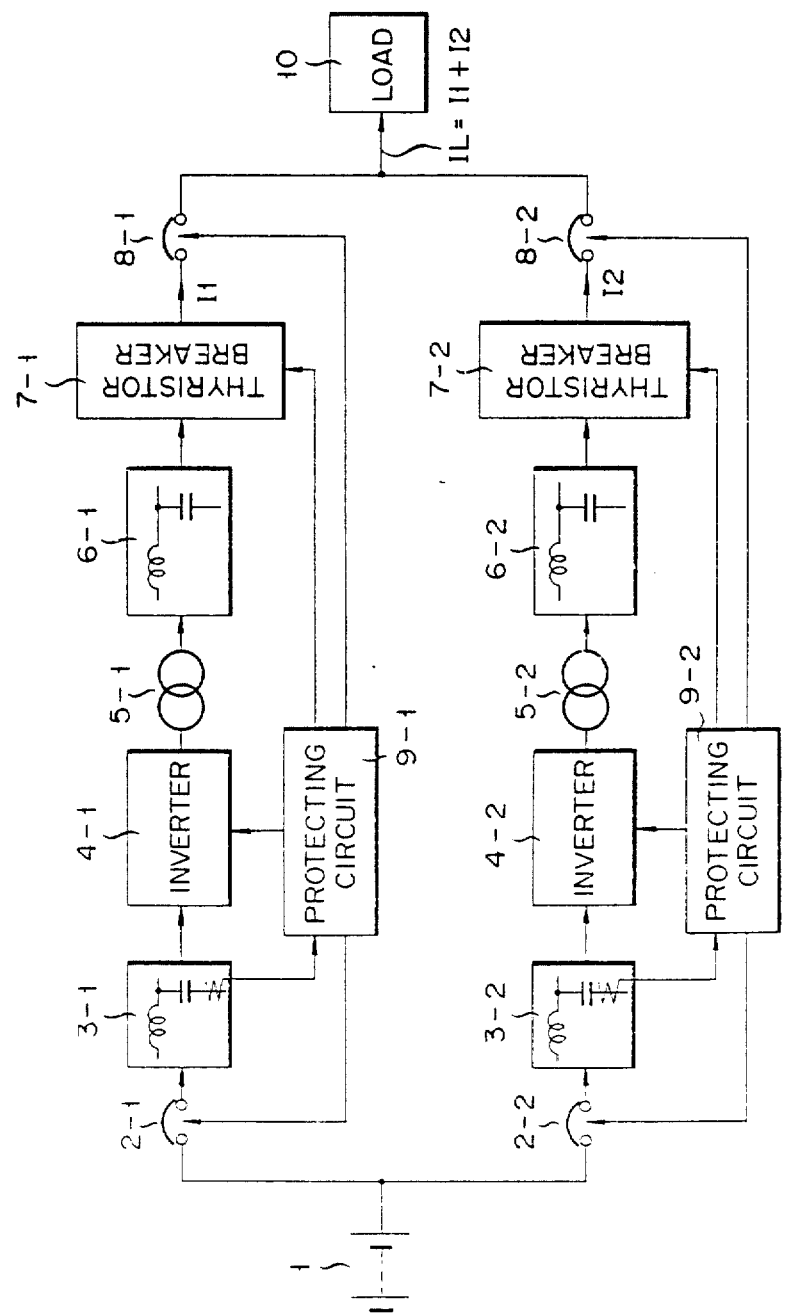
FIG. 1 is a circuit arrangement diagram showing a conventional no-break power supply apparatus connected with two CVCFs in parallel for operation.

FIG. 1 is a block diagram of the no-break power supply apparatus in which conventional two CVCFs are operated in parallel. In FIG. 1, reference numeral 1 designates a D.C. power supply, 2-1, 2—2 input breakers, 3-1, 3-2 D.C. filters, each having a reactor and a condenser, 4-1, 4-2 inverters, 5-1, 5-2 inverter transformers, 6-1, 6-1 A.C. filters, each having a reactor and a capacitor, 7-1, 7-2 thyristor breakers, 8-1, 8-2 output breakers, 9-1, 9-2 shortcircuit protecting circuits, and 10 a load. The latter numerals of the reference numerals after the hyphen denote the number of the CVCF, first or second.

The operation of the conventional no-break power supply apparatus shown in FIG. 1 will now be described. As to the first CVCF, the D.C. power supply 1 supplies power to the input breaker 2-1, the inverter 4-1 thus produces an alternating current through the D.C. filter 3-1, the alternating current is then converted through the inverter transformer 5-1 into a predetermined A.C. voltage. Then, harmonic wave voltages are removed from the alternating current through the A.C. filter 6-1 to the sinusoidal A.C. voltage having no distortion, which is in turn supplied through the thyristor breaker 7-1 and the output breaker 8-1 to the load 10. With respect to the second CVCF, the A.C. power is supplied to the load 10 by the operation from the input breaker 2—2 to the output breaker 8-2 in the same manner as those in the first CVCF. Thus, the first and second CVCFs are operated in parallel, and the synthesized power is supplied to the load 10, and both the CVCFs share equally the supplying power. When the inverter 4-1 fails in commutation in this state, causing a D.C. shortcircuit to occur, a discharging current will flow from the condenser of the D.C. filter 3-1 to the D.C. shortcircuit point of the inverter 4-1, and is detected by the current transformer inserted in series with the condenser of the D.C. filter 3-1, is then inputted to the shortcircuit protecting circuit 9-1, which in turn produces a signal for interrupting the thyristor breaker 7-1 to the thyristor breaker 7-1. Thus, the thyristor breaker 7-1 is immediately opened, thereby disconnecting the first CVCF which thus generates the D.C. shortcircuit from the proper second CVCF, continuously supplying 100% of A.C. power to the load 10 from the second CVCF, simultaneously producing a signal for opening the input breaker 2-1 and the output breaker 8-1 from the shortcircuit protecting circuit 9-1, and completely disconnecting the first CVCF thus failed from the power supply and the load.

As described above, the conventional no-break power supply apparatus in which CVCFs are operated in parallel requires thyristor breakers which can break at the output sides of the CVCFs always at a high speed.

On the other hand, according to the present invention, the thyristor breakers which were indispensable in the conventional no-break power supply apparatus can be eliminated, thereby providing a more simple and inexpensive no-break power supply apparatus.

An embodiment of the present invention will now be described with reference to the accompanying drawings.

Figure 2:
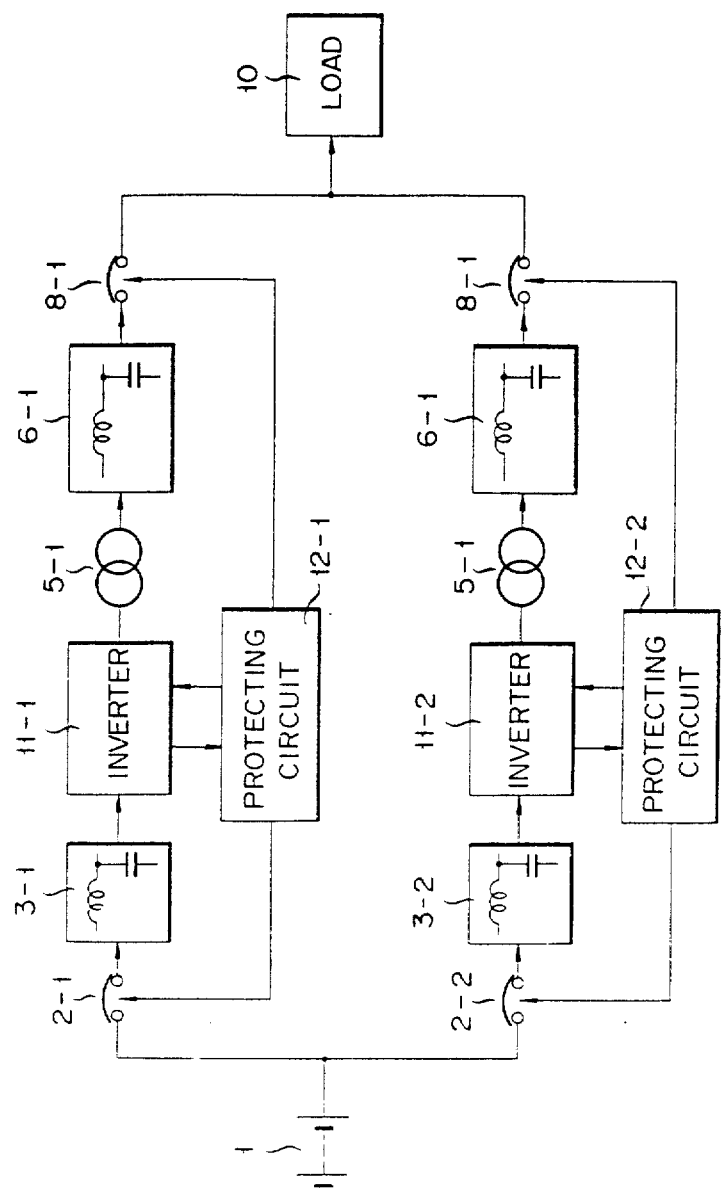
FIG. 2 is a circuit arrangement diagram showing an embodiment of the present invention.
Figure 3:
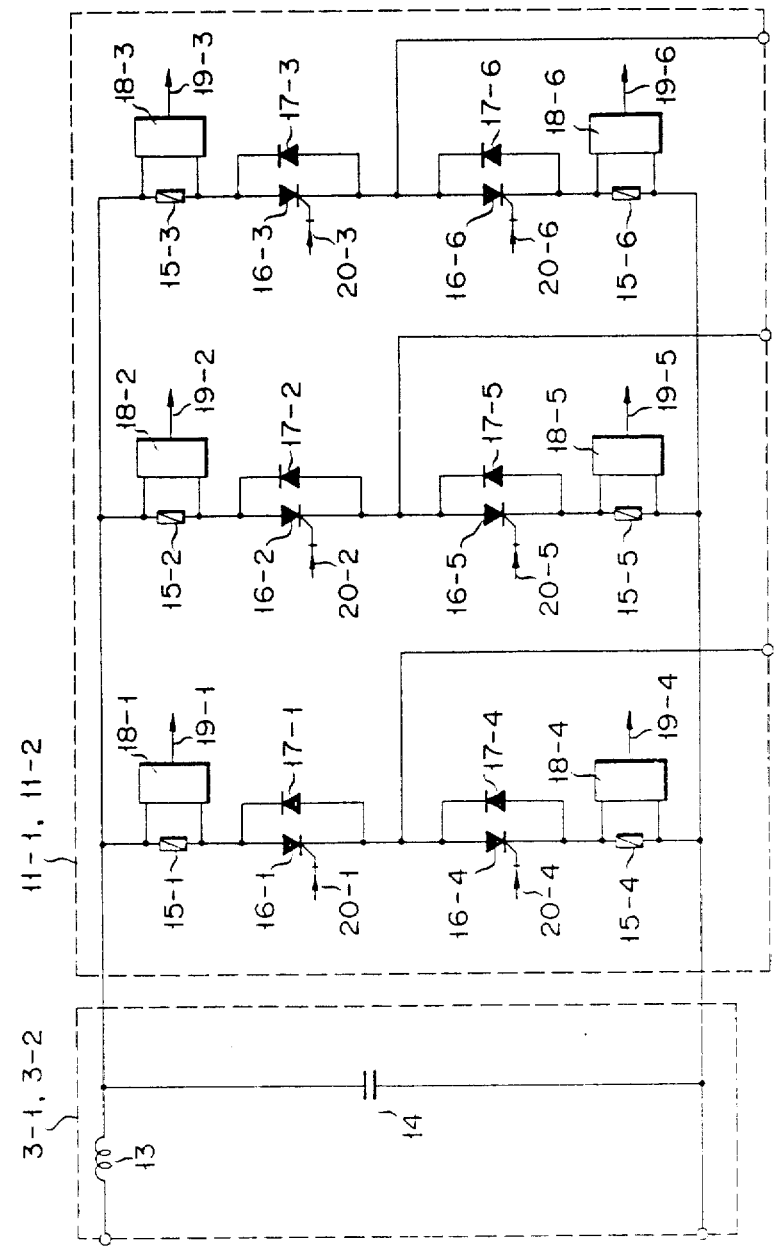
FIG. 3 is an actual circuit arrangement diagram of a D.C. filter and an inverter constructed of gate turn off thyristors shown in FIG. 1.
Figure 4:
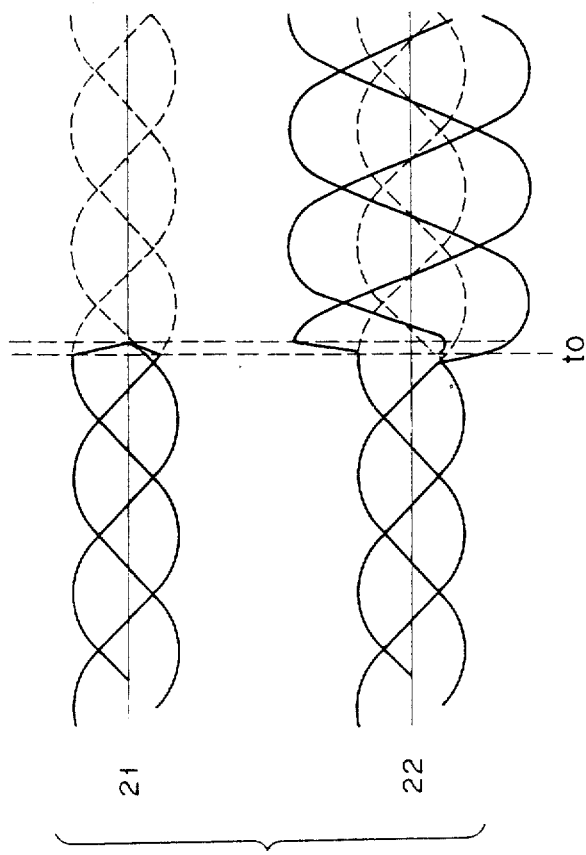
FIG. 4 is a waveform diagram showing the relationship of the output waveforms between the first apparatus and the second apparatus operated in parallel in FIG. 2.
Figure 5:
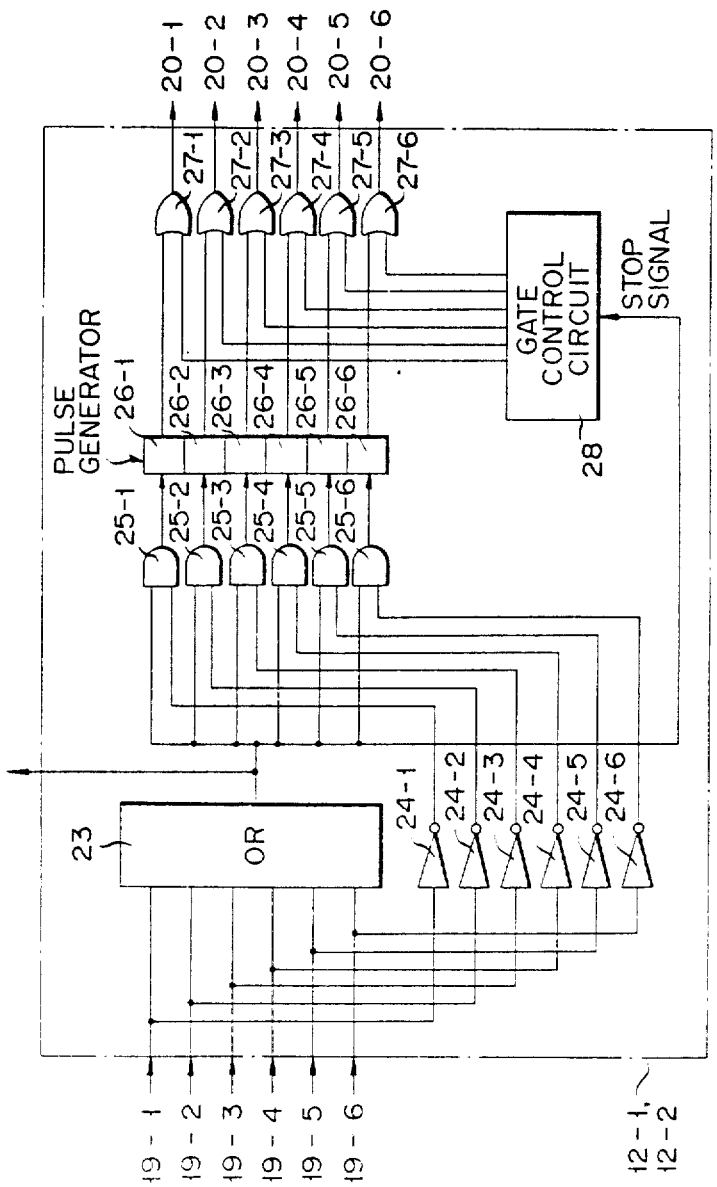
FIG. 5 is an actual circuit arrangement diagram showing an example of the protecting circuit in FIG. 2.
Figure 6:
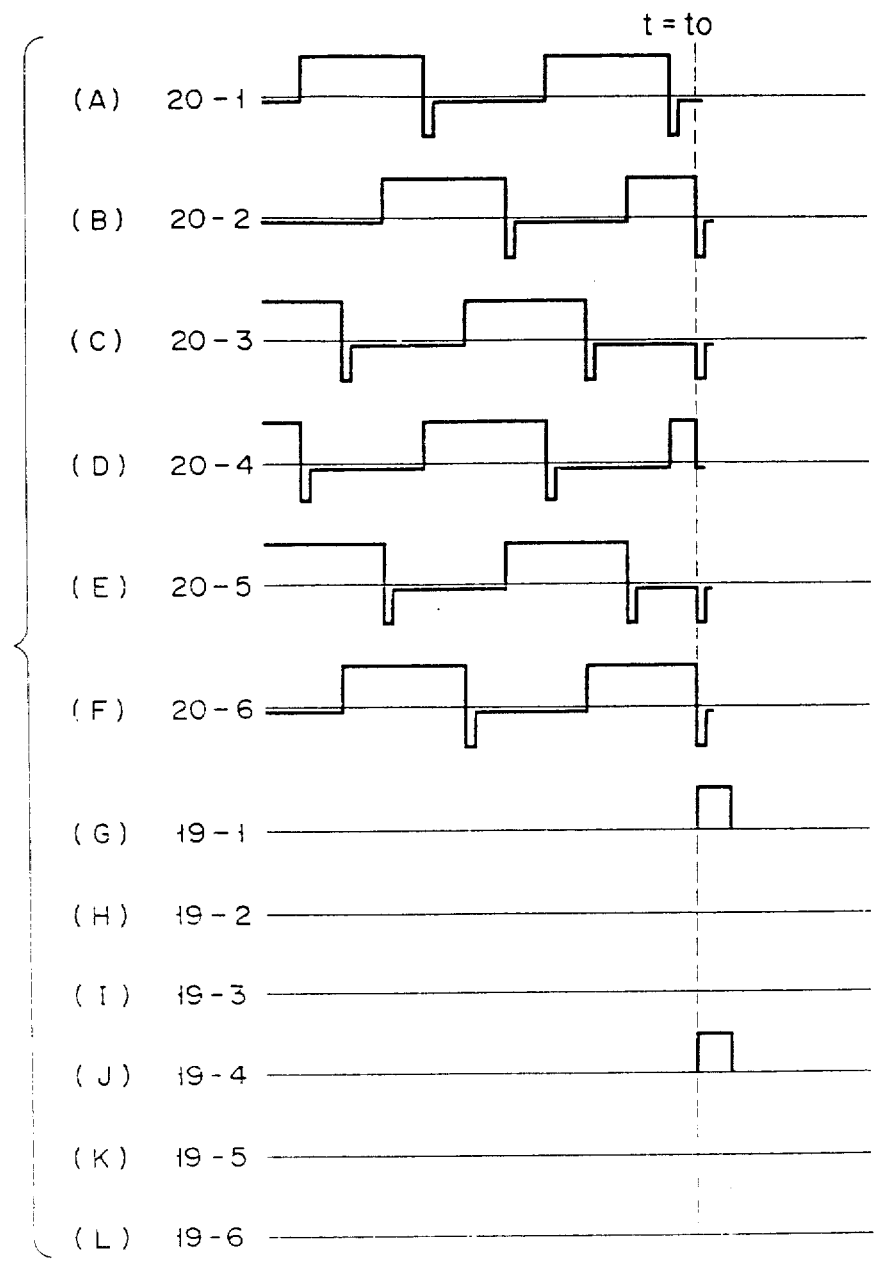
FIGS. 6(A) to 6(L) are time charts showing the relationship between the input signal and output signals of the protecting circuit in FIG. 5.

A preferred embodiment of the no-break power supply apparatus according to the present invention will now be described in construction and operation with reference to FIGS. 2 through 9(A) to 9(L). In the drawings, the same components and parts will be designated by the same or equivalent reference numerals as those in FIG. 1 and will be omitted in description of the construction and operation. FIG. 2 shows a block diagram showing the entire structure of the no-break power supply apparatus according to the present invention. Reference numerals 11-1, 11-2 designate inverters formed of GTO thyristors, and 12-1, 12-2 protecting circuits. FIG. 3 shows the detailed view of the inverters 11-1, 11-2 and D.C. filters 3-1, 3-2. Reference numeral 13 designates a reactor, 14 a capacitor, 15-1, 15-2, 15-3, 15-4, 15-5, 15-6 fuses, 16-1, 16-2, 16-3, 16-4, 16-5, 16-6 GTO thyristors, 17-1, 17-2, 17-3, 17-4, 17-5, 17-6 diodes, 18-1, 18-2, 18-3, 18-4, 18-5, 18-6 fuse melting detector, 19-1, 19-2, 19-3, 19-4, 19-5, 19-6 fuse melting detection signals, and 20-1, 20-2, 20-3, 20-4, 20-5, 20-6 gate signals to the GTO thyristors 16-1, 16-2, 16-3, 16-4, 16-5, 16-6. In FIG. 4, reference numerals 21, 22 the output current waveforms of the first and second CVCF. FIG. 5 is a detailed view of one example of the protecting circuits 12-1, 12-2 in FIG. 2. Reference numeral 23 depicts an OR circuit, 24-1, 24-2, 24-3, 24-4, 24-5, 24-6 inverter circuits, 25-1, 25-2, 25-3, 25-4, 25-5, 25-6 AND circuits 26-1, 26-2, 26-3, 26-4, 26-5, 26-6 pulse generator circuits, 27-1, 27-2, 27-3, 27-4, 27-5, 27-6 OR circuits, and 28 a gate control circuit which supplies an ON gate signal to the GTO thyristors when the inverters 11-1, 11-2 are normally inverted and which operates to block all the gate inputs to the GTO thyristors normally operated at the fuse shortcircuiting time. FIG. 6 is a timechart of the input and output signals of the protecting circuit in FIG. 5.

The operation of the no-break power supply apparatus of the present invention will now be described. In the normal operation, as shown in FIGS. 6(A) to 6(F), the gate signals 20-1, 20-2, 20-3, 20-4, 20-5, 20-6 for the GTO thyristors in case of $t < t_0$ are supplied to the inverters 11-1, 11-2, 11-3, 11-4, 11-5, 11-6 to convert the direct currents from the D.C. filters 3-1, 3-2 to direct currents, and then to supply the A.C. power to the load 10 through the inverter transformers 5-1, 5-2, A.C. filters 6-1, 6-2 and output breakers 8-1, 8-2. When the GTO thyristors 16-1 and 16-4 of the inverter 11-1 in case of $t = t_0$ are simultaneously conducted and become D.C. shortcircuited due to some causes, the fuses 15-1, 15-4 start melting due to the shortcircuit current. Thus, the fuse melting detectors 18-1, 18-4 each produce fuse melting detection signals 19-1, 19-4, which are inputted to the protecting circuit 12-1. Thus, the protecting circuit 12-1, as shown in FIG. 5, detect the meltings of the fuses 15-1 and 15-4 of the fuses 15-1, 15-2, 15-3, 15-4, 15-5, 15-6 via the OR circuit 23. Then, the fuse melting detection signals 19-1, 19-4 thus obtained through the OR circuit 23 are inputted to the gate control circuit 28 to block all the gate signals supplied to the gates of the respective GTO thyristors normally operated so far. Then, the outputs of the inverter circuits 24-1, 24-2, 24-3, 24-5, 24-6 which receive the fuse melting detection signals 19-1, 19-2, 19-3, 19-4, 19-5, 19-6 and the outputs from the OR circuit 23 are applied to the inputs of the AND circuits 25-1, 25-2, 25-3, 25-4, 25-5, 25-6, which in turn produce outputs to the pulse generator circuits 26-1, 26-2, 26-3, 26-4, 26-5, 26-6. However, outputs are obtained from the inverter circuits 24-2, 24-3, 24-4, 24-5, 24-6 due to the production of the fuse melting detection signals 19-1, 19-4, are inputted to the AND circuits 25-2, 25-3, 25-5, 25-6, and the outputs from these AND circuits are in turn inputted to the pulse generator circuits 26-2, 26-3, 26-5, 26-6, the OFF gate signals to the GTO thyristors 16-2, 16-3, 16-5, 16-6 are outputted, and are in turn inputted to the GTO thyristors 16-2, 16-3, 16-5, 16-6 of the GTO inverter 11-1 through the OR circuits 27-2, 27-3, 27-5, 27-6, and the GTO thyristors 16-2, 16-3, 16-5, 16-6 becomes OFF state. These states are shown in the time-charts in FIGS. 6(A) to 6(L). In the GTO thyristors 16-1, 16-4 which produce D.C. shortcircuits, the fuses 15-1, 15-4 break the shortcircuit currents, thereby eliminating the shortcircuits. Simultaneously, the meltings of the fuses are detected, and the OR circuit 23 of the protecting circuit 12-1 produces a signal for setting the input breaker 2-1 and the output breaker 8-1 to open state, thereby disconnecting the first CVCF which produces the accident from the parallel operation. FIG. 4 shows the output current waveforms of the first and second CVCFs by reference numerals 21 and 22. The first CVCF which produces the D.C. shortcircuit at $t = t_0$ receives the current from the proper CVCF, and the output current is attenuated in a direction toward zero after approx. 1 to 2 msec. At this time, the OFF gate signal is applied to the proper GTO thyristors 16-2, 16-3, 16-5, 16-6 which do not produce an accident as described above to break the normal operation of the GTO thyristors. Then, the inverter 11-1 sets the proper GTO thyristor to open state, disconnecting the GTO thyristors 16-1, 16-4 which produce an accident and breaking and stopping the inverter 11-1 which thus produces the accident within the range not affecting the proper CVCF.

Another example of the protecting circuits 12-1, 12-2 will now be described with reference to FIG. 7

Figure 7:
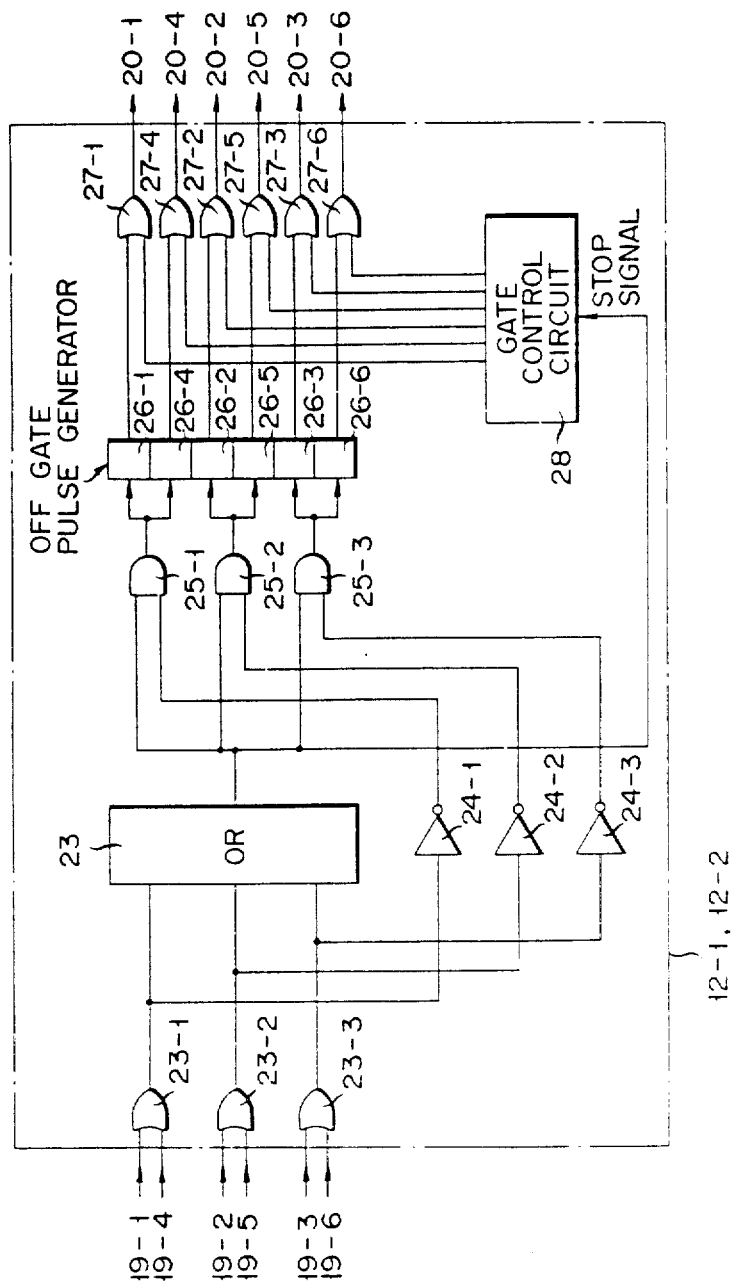
FIG. 7 is a circuit arrangement diagram showing another example of the protecting circuit.

The circuit arrangement of the protecting circuit in FIG. 7 is different from that in FIG. 5 in that fuse melting detection signals 19-1 to 19-6 inputted to the protecting circuits are inputted as a pair of a fuse melting detection signal generated when the fuse connected to an arbitrary one arm of the bridge forming the inverter is melted and a fuse melting detection signal generated when the fuse in the arm connected in series with the previous arm is melted, such as for example, the fuse melting detection signals 19-1 and 19-4, 19-2 and 19-5, for 19-3 and 19-6, correspondingly to the OR circuits 23-1, 23-2, 23-3 and then inputted to the OR circuits 23. Since the OR circuits 23-1, 23-2, 23-3 are connected in this manner, the outputs of these OR circuits are inputted to the corresponding inverters 24-1, 24-2, 24-3 and are then inputted to the OFF gate pulse generators 26-1, 26-4, 26-2, 26-5 and 26-3, 26-6 through the AND circuits 25-1, 25-2, 25-3. The circuit arrangements in FIG. 7 which are the same as those in FIG. 5 are designated by the same reference numerals and will be omitted in description.

The operations of the protecting circuits will now be described with reference to FIGS. 6(A) to 6(L).

If the GTO thyristors 16-1 and 16-4 of the inverter 11-1 are simultaneously energized and thus become a D.C. shortcircuit due to reasons such as in the case of $t=t_0$, the fuses 15-1 and 15-4 start melting due to the shortcircuit currents. Thus, the fuse melting detectors 18-1, 18-4 produce fuse melting detection signals 19-1, 19-4, which are inputted to the protecting circuit 12-1. Thus, the protecting circuit 12-1 detects any of the fuses 15-1, 15-2 which melt earlier via the OR circuit 23-1 and locks all the gate signals to the gates of the GTO thyristors of the inverters 11-1, 11-2 which are normally operated via the gate control circuit 28. Then, the fuse melting detection signals 19-1, 19-4 thus generated due to the accident are inputted to the OR circuit 23-1, and the output from the OR circuit 23-1 is in turn inputted to the AND circuit 15-1 through the inverter circuit 14-1. Thus, the AND circuit 25-1, since receiving all the outputs of the OR circuits 23, receives the fuse melting detection signals 19-1, 19-4, the AND circuits 25-2, 25-3 become logic "1", and produces an output to the OFF gate pulse generator circuit 26-3, 26-5, 26-6, and the OFF gate signals corresponding to the GTO thyristors 16-2 16-3, 16-5, 16-6 are outputted from the pulse generator circuits 26-2, 26-3, 26-5, 26-6. Thus, the OFF gates are inputted to the gates of the GTO thyristors 16-2, 16-3, 16-5, 16-6 through the OR circuits 27-2, 27-3, 27-5, 27-6, and the GTO thyristors 16-2, 16-3, 16-5, 16-6 become OFF state. The GTO thyristors 16-1, 16-4 which generate the D.C. shortcircuit break the shortcircuit current via the fuses 15-1, 15-4, thereby eliminating the D.C. shortcircuit. These states are evident from the timecharts in FIGS. 9(A) to 9(L). The protecting circuit 12-1 generates a signal for setting the input breaker 2-1 and the output breaker 8-1 to open state from the OR circuit 23 simultaneously when performing the protecting operation, thereby disconnecting the first CVCF which produces an accident from the parallel operation.

In the embodiment described above, when the fuses 15-1, 15-4 connected to the GTO thyristors 16-1, 16-4 were melted, even in case of an accident where either one of the fuses is melted, it is inputted to any of the OR circuits 23-1, 23-2, 23-3 and is inputted to the OFF gate pulse generators 26-1, 26-2 through the OR circuit 23, inverters 24-1, 24-2, 24-3 and AND circuits 25-1, 25-2, 25-3. Accordingly, the OFF gate pulse generator can produce corresponding pair outputs in accordance with either one output of the AND circuits 25-1, 25-2, 25-3. These pair outputs are fed to the OR circuits 27-1 to 27-6, which in turn produce OFF gate signals 20-1 to 20-6 corresponding to the GTO thyristors of the pair. This means that, in the bridge circuit in FIG. 3, the GTO thyristor connected to the melted fuse due to the accident is interrupted at the gate, and simultaneously the GTO thyristor connected to the arm connected in series with the arm connected with the GTO thyristor is also interrupted, thereby more effectively performing the breaking operation.

Still another example of the protecting circuit will be described with reference to FIGS. 8 and 9 in circuit arrangement and its operation.

Figure 8:
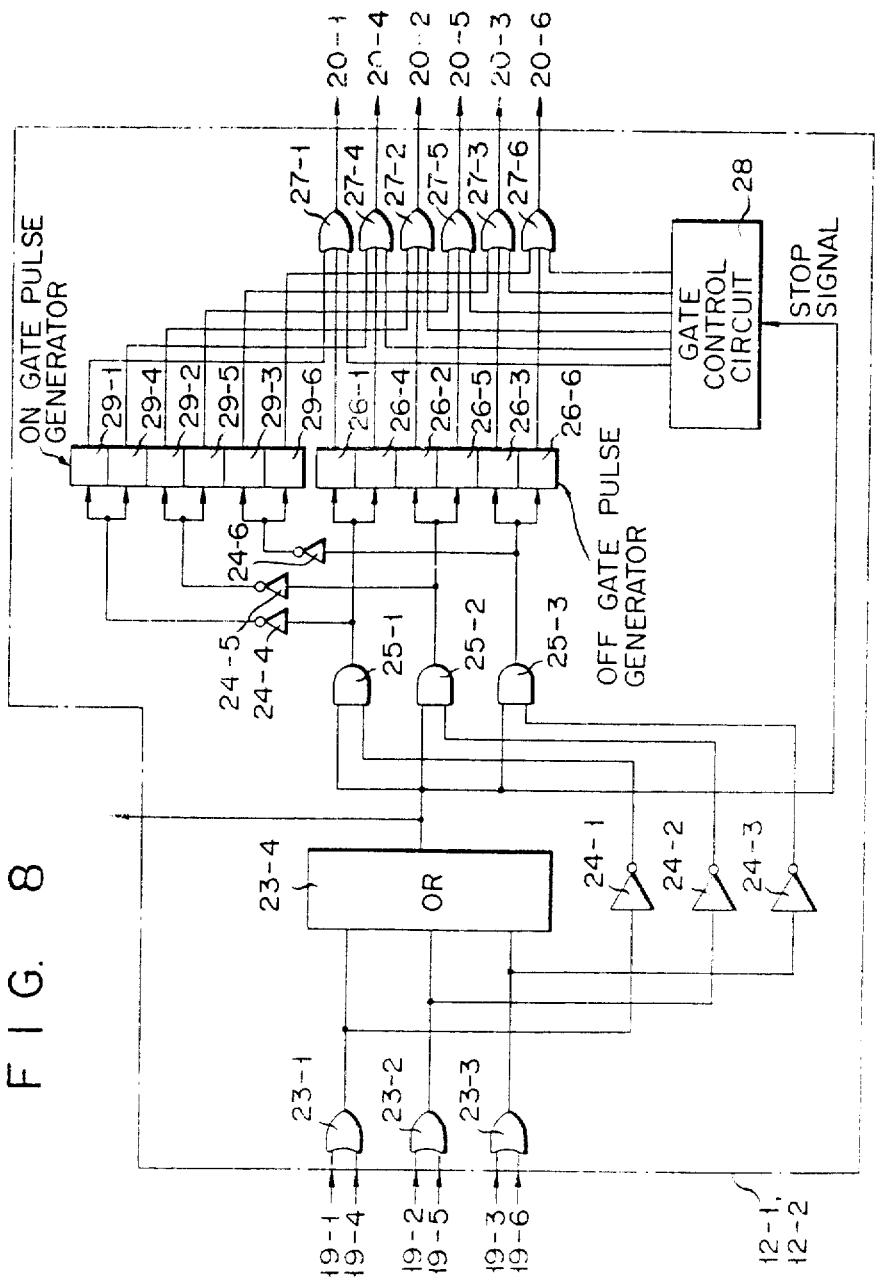
FIG. 8 is a circuit arrangement diagram showing still another example of the protecting circuit.
Figure 9:
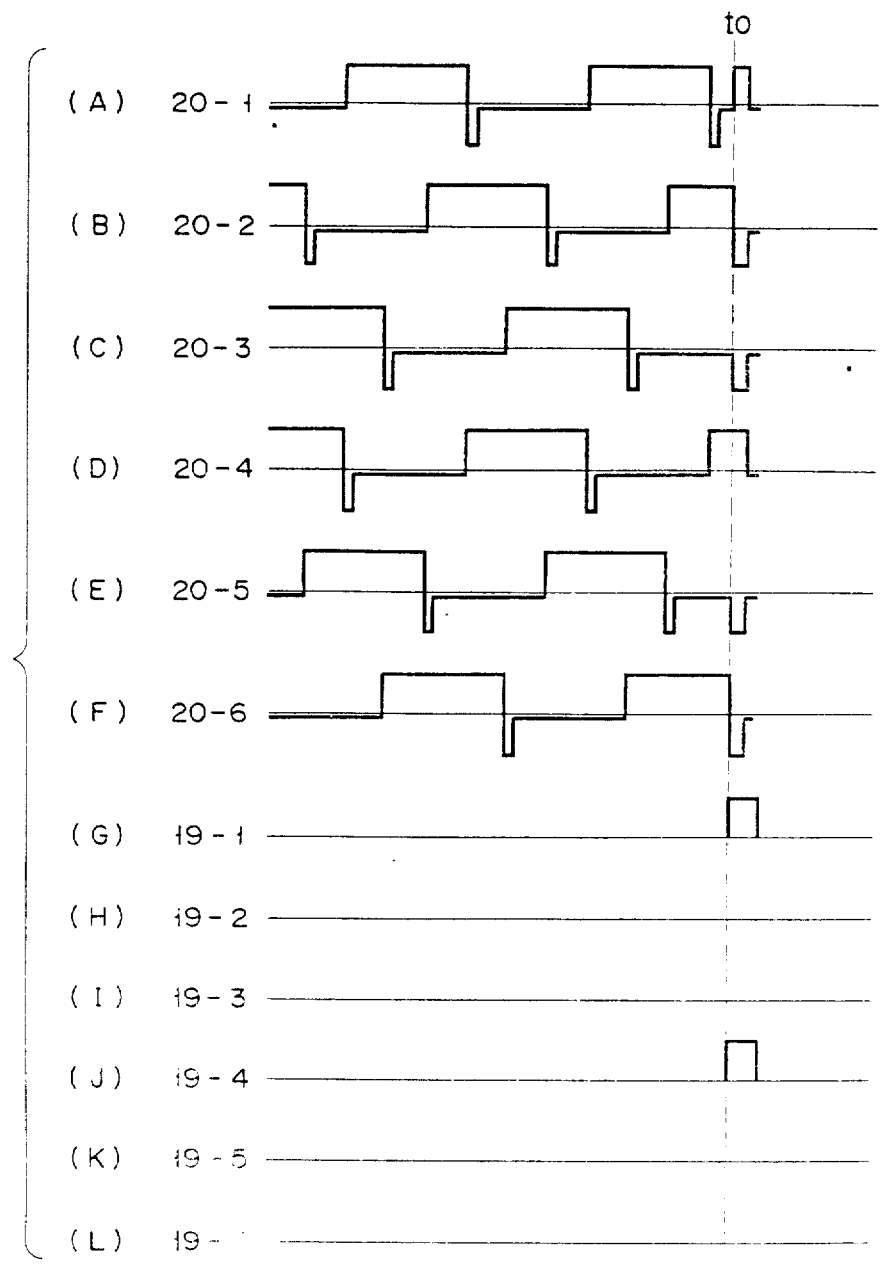
FIGS. 9(A) to 9(L) are timecharts showing the relationship between the input signal and the output signal of the protecting circuit in FIG. 8.

The circuit arrangement of the protecting circuit in FIG. 8 is the same as that in FIG. 7 except that the outputs from the AND circuits 25-1, 25-2 25-3 as pair inputs to the ON pulse generators 29-1, 29-4, 29-5 and 29-3, 29-6 through the inverters 24-4, 24-5, 24-6, and the outputs from the ON pulse generators 29-1 to 29-6 are inputted to the OR circuits 27-1, 27-4, 27-2, 27-5, 27-3, 27-6, and the description of the arrangement will be accordingly omitted.

Next, the operation of the protecting circuit in FIG. 8 will be described. If the protecting fuse 15-1 for the GTO thyristor 16-1 of the inverter 11-1 starts melting due to an accident in case of $t=t_0$, the fuse melting detection signal 19-1 is outputted from the fuse melting detector 18-1, a block command is inputted to the gate control circuit 28 through the OR circuit 23-4, and all the gate signals of the GTO thyristors 16-1, 16-2, 16-3, 16-4, 16-5, 16-6 which are normally operated are blocked. The output of the OR circuit 23-1 which thus receives th fuse melting detection signal 19-1 is interrupted by the inverter circuit 24-1, the outputs from the other inverter circuits 24-2, 24-3 are inputted to the AND circuits 25-2, 25-3, and the output of the OR circuit 23-4 is also applied to the AND circuits 25-2, 25-3, which produces the output to the OFF gate pulse generators 26-2, 26-5, 26-3, 26-6, which in turn produces OFF gate signals 20-2, 20-5, 20-3, 20-6 corresponding to the GTO thyristors 16-2, 16-3, 16-5, 16-6 through the OR circuits 27-2, 27-5, 27-3, 27-6. Further, the inverter circuits 24-5, 24-6 which receives the outputs from the AND circuits 25-2, 25-3 are interrupted, the output from the inverter circuits 24-4 is inputted to the ON gate pulse generator circuits 29-1, 29-4, and the ON gates from the pulse generator circuits 29-1, 29-4 are outputted as the ON gate signal corresponding to the GTO thyristors 16-1, 16-4 through the OR circuits 27-1, 27-4. Since the output signals from the ON gate pulse generator circuits 29-1, 29-2, 29-3, 29-4, 29-5, 29-6, OFF gate pulse generator circuits 26-1, 26-2, 26-3, 26-4, 26-5, 26-6 and gate control circuit 28 become the gate signals 20-1, 20-2, 20-3, 20-4, 20-5, 20-6 of the GTO thyristors 16-1, 16-2, 16-3, 16-4, 16-5, 16-6 through the OR circuits 27-1, 27-2, 27-3, 27-4, 27-5, 27-6, the ON gate signal is inputted to the GTO thyristors 16-1, 16-4, both simultaneously becoming ON state in the D.C. shortcircuit. Thus, the fuses 15-1, 15-4 are simultaneously melted and broken. The OFF gate signal is inputted to the other GTO thyristors 16-2, 16-3, 16-5, 16-6, which thus becomes OFF state. These states are shown in the timecharts in FIGS. 9(A) to 9(L). Simultaneously, the protecting circuit 12-1 produces a signal for setting the input breaker 2-1 and the output breaker 8-1 to open state in the same manner as described above, thereby disconnecting the first CVCF causing the accident from the parallel operation.

In the embodiments described above, the protecting circuit detects the melting fuse due to the accident, blocks the gate signals of all the GTO thyristors in accordance with the fuse melting detection signal, then supplies the ON gate signals to the gates of the thyristors connected to the arm containing the melting fuse and the gate of the GTO thyristor connected to the arm connected in series with the arm, and supplying the OFF gate signals to the GTO thyristors connected to the other arms, thereby setting the corresponding GTO thyristors to OFF state. In this manner, this protecting circuit can effectively perform the breaking operation at the arm containing the melting fuse. In any case, according to the no-break power supply apparatus of the present invention, the GTO thyristor which is short-circuited due to the accident is broken due to the melting fuse, and the input and output breakers are simultaneously opened, thereby breaking and stopping the inverter which produces the accident without adversely affecting the influence of the accident to the proper CVCF.

What is claimed is:

1. A no-break power supply apparatus comprising: a plurality of CVCF's each CVCF having:
    input breaker means connected to a D.C. power supply;
    output breaker means connected to a load,
    D.C. filter means connected to said input breaker means;
    inverter means constructed of gate turn off thyristors connected to said D.C. filter means for converting the direct current from said D.C. power supply into an alternating current, said inverter means having a bridge circuit having an arm including a parallel circuit including a GTO thyristor and a diode connected in reverse polarity in parallel with the GTO thyristor, a fuse connected in series with the parallel circuit and a fuse melting detector connected across the fuse;
    protecting circuit means connected to said fuse melting detector in said inverter means for detecting the melting of the fuse corresponding to an accident by the corresponding fuse melting detector in said inventor means, blocking a gate signal supplied to the gates of all the GTO thyristors normally operated by the output of the detector, then supplying an OFF gate signal to the gates of said all the GTO thyristors except the GTO thyristor connected to the arm of the fuse thus melted and supplying a breakage command signal to said input breaker means and said output breaker means;
    inverter transformer means connected to said inverter means for converting the output voltage into a predetermined voltage; and
    A.C. filter means connected to said inverter transformer means for removing the high frequency component from the A.C. voltage and supplying the sinusoidal A.C. voltage to a load through the output breaker.

2. The no-break power supply apparatus according to claim 1, wherein the GTO thyristors in said inverter supplied with the OFF gate signal outputted from said protecting means are GTO thyristors except the GTO thyristor connected to the arm connected with the melting fuse due to the accident.

3. The no-break power supply apparatus according to claim 1, wherein the GTO thyristor in said inverter supplied with the OFF gate signal outputted from said protecting circuit means are GTO thyristors except the GTO thyristor connected to the arm connected with the melting fuse due to the accident and the GTO thyristor connected to the arm connected in series with the arm.

4. The no-break power supply apparatus according to claim 1, wherein the GTO thyristor in said inverter supplied with ON gate signal outputted from said protecting circuit means is a GTO thyristor connected to the arm connected with the melting fuse due to the accident and the GTO thyristor connected to the arm connected in series with said arm, and said GTO thyristor in said inverter supplied with the OFF gate signal outputted from said protecting circuit means is a GTO thyristor except the GTO thyristor connected with the melting fuse due to the accident and the GTO thyristor connected in series with the arm.

* * * * *